US012725855B2

(12) United States Patent
Pirnar

(10) Patent No.: US 12,725,855 B2
(45) Date of Patent: Sep. 1, 2026

(54) BATTERY COOLING SYSTEM AND METHOD FOR OPERATING A BATTERY COOLING SYSTEM

(71) Applicant: Pipistrel d.o.o., Ajdovscina (SI)

(72) Inventor: Jernej Pirnar, Ajdovscina (SI)

(73) Assignee: Pipistrel d.o.o., Ajdovscina (SI)

( * ) Notice: Subject to any disclaimer, the term of this patent is extended or adjusted under 35 U.S.C. 154(b) by 315 days.

(21) Appl. No.: 18/498,929

(22) Filed: Oct. 31, 2023

(65) Prior Publication Data

US 2025/0140977 A1 May 1, 2025

(51) Int. Cl.

| | |
|---|---|
| ***H01M 10/6568*** | (2014.01) |
| ***H01M 10/42*** | (2006.01) |
| ***H01M 10/613*** | (2014.01) |
| ***H01M 10/625*** | (2014.01) |
| ***H01M 10/633*** | (2014.01) |
| ***H01M 10/6551*** | (2014.01) |

(52) U.S. Cl.

CPC ..... *H01M 10/6568* (2015.04); *H01M 10/425* (2013.01); *H01M 10/613* (2015.04); *H01M 10/625* (2015.04); *H01M 10/633* (2015.04); *H01M 10/6551* (2015.04); *H01M 2010/4271* (2013.01); *H01M 2220/20* (2013.01)

(58) Field of Classification Search

CPC ........... H01M 10/6568; H01M 10/613; H01M 10/625; F24F 1/0063; F28D 7/0008; F28D 1/1607; F28D 1/0246; F28D 7/1638; F28D 7/1653; F28D 9/0006; F28D 9/0081; F28D 9/00; F28D 7/16; F28D 1/06

USPC .......................................................... 165/287

See application file for complete search history.

(56) References Cited

U.S. PATENT DOCUMENTS 6,540,015 B1 4/2003 Kawachi et al.
6,962,194 B2 * 11/2005 Martin .................... F28F 3/027 29/890.039
8,387,362 B2 * 3/2013 Storage ................... F02K 3/115 60/266
9,732,702 B2 * 8/2017 Ueda ......................... F28F 3/02
10,744,603 B2 * 8/2020 Machler .................. B23P 15/26
11,785,742 B2 * 10/2023 Nadarajah ............... F28D 1/035 361/679.53
2013/0032315 A1 2/2013 Forster et al.
2014/0076526 A1 3/2014 Sakai et al.
2023/0383962 A1 11/2023 Li et al.

FOREIGN PATENT DOCUMENTS

| | | | | |
|---|---|---|---|---|
| CA | 3208204 A1 | | 8/2022 | |
| CN | 103502763 A | | 1/2014 | |
| DE | 102013217287 A1 | * | 3/2014 | .............. F28F 1/022 |
| FR | 3129717 A1 | | 6/2023 | |
| JP | 2002098424 A | | 4/2002 | |

* cited by examiner

*Primary Examiner* — Jon T. Schermerhorn, Jr.
(74) *Attorney, Agent, or Firm* — Slater Matsil, LLP

(57) ABSTRACT

In an embodiment a heat exchanger includes a base body, cooling fins protruding from a first side of the base body, first channels integrated in the base body and connected to a first connector and a second connector, the first channels configured to guide a first coolant and second channels integrated in the base body and connected to a first connector and a second connector, the second channels configured to guide a second coolant, wherein the first channels are separate from the second channels and wherein the heat exchanger is capable of being integrated in an outside surface of a vehicle.

20 Claims, 9 Drawing Sheets

420
415
410
450
460
40

BATTERY COOLING SYSTEM AND METHOD FOR OPERATING A BATTERY COOLING SYSTEM

TECHNICAL FIELD

The present invention generally relates to a battery cooling system for a vehicle battery unit and a method for operating such a battery cooling system, and, in particular embodiments, to a battery cooling system for an aeronautic vehicle.

BACKGROUND

Various battery cooling systems for vehicles are known.

SUMMARY

In accordance with an embodiment a heat exchanger includes a base body, cooling fins protruding from a first side of the base body, first channels integrated in the base body and connected to a first connector and a second connector, the first channels configured to guide a first coolant and second channels integrated in the base body and connected to a first connector and a second connector, the second channels configured to guide a second coolant, wherein the first channels are separate from the second channels and wherein the heat exchanger is capable of being integrated in an outside surface of a vehicle.

In accordance with another embodiment a vehicle includes a heat exchanger having first channels integrated into the heat exchanger and connected to a first connector and a second connector and second cooling and heating channels integrated into the heat exchanger and connected to a first connector and a second connector, wherein the first channels are separate from the second channels, a battery pack and an electric pump, first coolant lines connecting the battery pack and the pump to the first and second connectors of the first channels of the heat exchanger thereby forming a closed loop and second coolant lines connecting the first and second connectors of the second channels to outside connectors, wherein the outside connectors are arranged at an outside surface of the vehicle.

In accordance with a further embodiment a vehicle includes a battery temperature control system comprising a battery pack and a battery management system in connection with the battery temperature control system and configured to operate the battery temperature control system in a first cooling mode when a temperature of the battery is above a first predetermined temperature, the first mode configured to cool a coolant, to operate the battery temperature control system in a second cooling mode when the temperature of the battery is above a second predetermined temperature, the second mode configured to cool the coolant, to operate the battery temperature control system in a third heating mode when the temperature of the battery is below a third predetermined temperature, the third mode configured to heat the coolant and to operate the battery temperature control system in a fourth idle mode when the temperature of the battery is between the first predetermined temperature or the second predetermined temperature and the third predetermined temperature.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Embodiments provide a boom integrated heat exchanger for an aviation vehicle. Further embodiments provide a heat exchanger configured to provide coolant-to-coolant cooling and/or heating, and air-to-coolant cooling for a vehicle battery unit or vehicle energy storage unit. The heat exchanger may provide three different functionalities: 1) cooling the battery (unit) when the aviation vehicle is airborne; 2) cooling the battery (unit) when the aviation vehicle is on ground or parked and battery (unit) temperature is elevated above a predetermined temperature in order to, e.g., precondition the battery (unit) for safe take off; and 3) heating the battery (unit) when the aviation vehicle is on ground or parked and battery (unit) temperature is below a predetermined temperature in order to, e.g., precondition the battery (unit) for efficient electrical charging.

Figure 1:
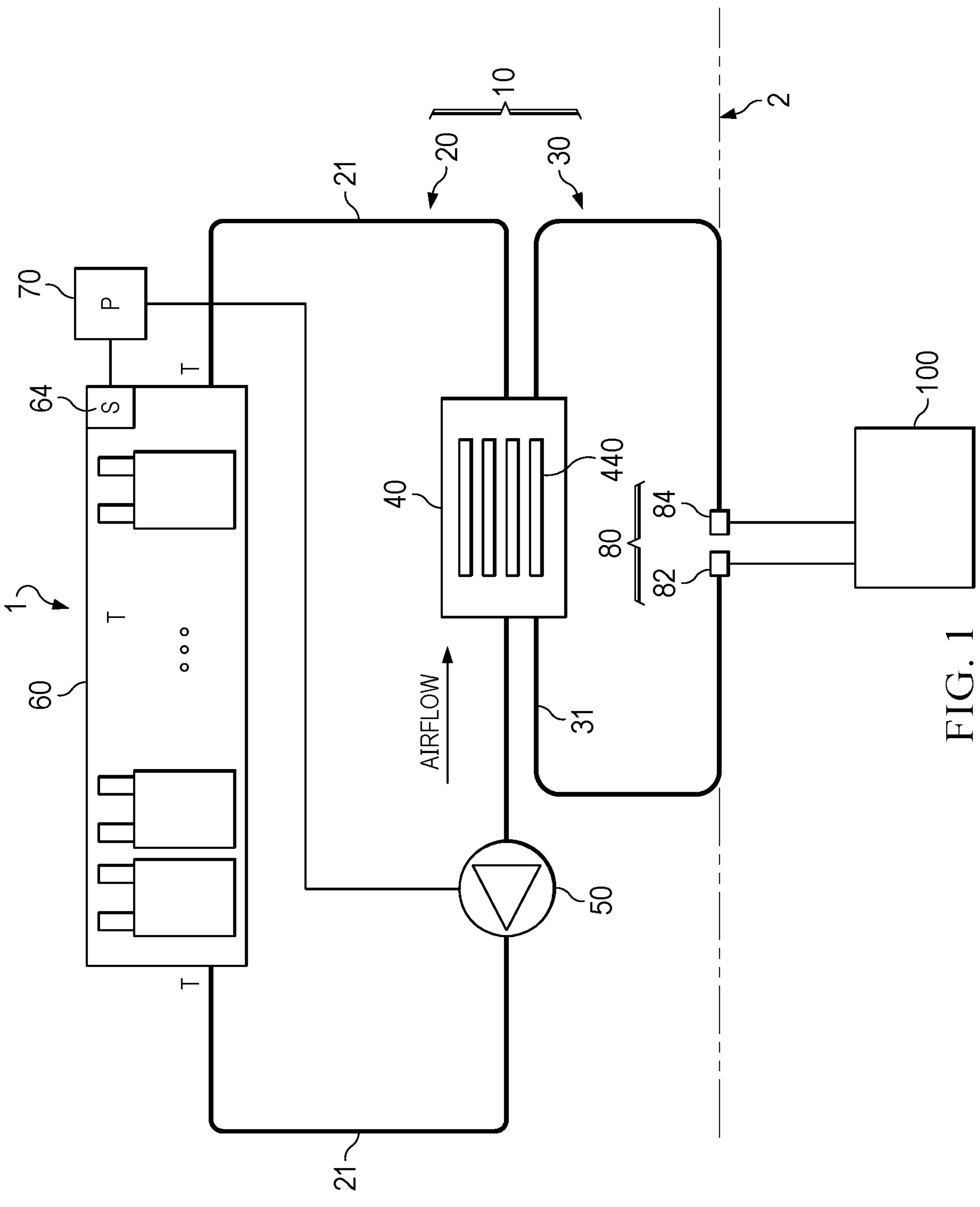
FIG. 1 shows a block diagram of a battery temperature control system according to embodiments.

FIG. 1 shows a block diagram of a battery temperature control system 10 for a vehicle battery unit 1. The related vehicle may be an aviation vehicle such as an aircraft or a drone. According to various embodiments the aviation vehicle may be a vertical take-off and landing (VTOL) vehicle and the vehicle battery unit 1 may provide power to a vehicle engine unit that is (or is part of) a vertical thrust unit (VTU).

The battery temperature control system 10 comprises a direct battery temperature control system 20 and a ground temperature control system 30. The vehicle battery unit 1 as shown in FIG. 1 may be a vehicle battery unit 1 for a single vehicle engine unit/VTU and in particular for a motor controller of an electric motor and/or electric motor. The direct battery temperature control system 20 comprises a heat exchanger 40, a device 50 configured to move the coolant (e.g., electric pump), a battery (pack) 60 and first coolant lines 21. The components 40-60 of the direct battery temperature control system 20 may be independent and distinct and are connected by the first coolant lines 21. The first coolant lines 21 may directly connect the components 40-60 to each other. The system 20 with the first coolant lines 21 may form a closed battery cooling circuit or closed battery cooling loop. The electric pump 50 moves or circulates the first coolant through the closed battery cooling circuit or loop. The components 40-60 may be arranged in a different order or may include additional components. In various embodiments a single first coolant line 21 connects an element 40-60 to another element 40-60. Alternatively, multiple first coolant lines 21 can connect one element 40-60 to another element 40-60.

The ground temperature control system 30 may comprise the heat exchanger 40, outside connectors 80 arranged at an outside surface of the vehicle 2 and second coolant lines 31. The second coolant lines 31 may directly connect the heat exchanger 40 to the outside connectors 80. The outside connectors 80 may be connectable to a ground support equipment 100. The ground support equipment 100 (sometimes also referred to as on-ground chiller) may be configured to provide warm or hot coolant in order to warm up the vehicle battery unit 1 (and in particular the battery (pack) 60) or cold coolant in order to cool the vehicle battery unit 1 (and especially the battery (pack) 60). The ground temperature control system 30 together with the connected ground support equipment 100 may form a closed cooling circuit or loop and/or a closed heating circuit or loop for the vehicle battery unit 1.

In various embodiments the ground support equipment 100 comprises the pump configured to move the second coolant in the closed cooling or heating circuit. In various other embodiments such a pump is integrated in the ground temperature control system 30.

In various embodiments, two (e.g., more than one), three (e.g., more than two), four (e.g., more than three) or six (e.g., more than five) heat exchangers and related coolant lines are connected to one single pair of outside connectors 80 arranged at an outside (side) surface of a boom meaning at least two heat exchangers are connected via second coolant lines 31. In various further embodiments one second coolant line 31 connects the heat exchanger 40 to a first outside connector 82 and another second coolant line 31 connects the heat exchanger 40 to a second outside connector 84. Alternatively, more than one second coolant line 31 can connect the outside connectors 82, 84 to the heat exchanger 40, respectively.

The first and second coolant lines 21, 31 may be flexible, semiflexible, or hard tubes or pipes. They might be made of plastic, rubber, silicone, or a combination thereof. Alternatively, they are made from metal such as aluminum.

The first coolant lines 21 of the direct battery temperature control system 20 and the second coolant lines 31 of the ground temperature control system 30 are two different and independent systems and do not intersect so that the first coolant in the system 20 cannot flow to the ground temperature control system 30 or can mix with the second coolant of the second system. The same is true for second coolant, i.e., it cannot flow into the first coolant system or mix with the first coolant. The systems are two independent systems, which are thermally connected via the heat exchanger 40.

The heat exchanger 40 comprises and integrates an air-to-coolant (e.g. air-to-liquid) type heat exchanger and a coolant-to-coolant (liquid-to-liquid) type heat exchanger. The air-to-coolant type heat exchanger includes cooling fins 440 and first channels (part of the direct battery temperature control system 20) and the coolant-to-coolant type heat exchanger includes second channels (as part of the ground temperature control system 30) and the first channels. The first coolant in the first channels is cooled when the aviation vehicle moves, e.g., when it is airborne and air moves over the cooling fins 440. Moreover, the first coolant inside the first channels may also be cooled when a second coolant moving inside the second channels (sometimes also called cooling chambers) cools the first coolant in the first cooling channel via thermal exchange. Alternatively, the first coolant in the first channels may be heated when a second coolant moving in the second channels heats the first coolant in the first cooling channel via thermal exchange.

The heat exchanger 40 may have a first input 452 to which a first coolant line 21 is connectable and a first output 454 to which another first coolant line 21 is connectable. The heat exchanger 40 may comprise a second input 462 to which a second coolant line 31 is connectable and a second output 464 to which another second coolant line 31 is connectable. The heat exchanger 40 comprises a heat sink having the cooling fins 440.

The device 50 configured to move the coolant might be a pump such as an electric pump. The operation of the pump 50 may be regulated so that the battery (pack) 60 is not sub-cooled below a predetermined temperature or heated above another predetermined temperature. The operation of the pump 50 may be controlled by a battery management system (BMS) such as a processor or a controller 70. The device 50 may have an input to which a first coolant line 21 is connectable and an output to which another first coolant line 21 is connectable.

The battery or battery pack 60 may comprises battery cells (e.g., pouch cells or cylindrical cells), an internal thermal conditioning system (i.e., coolant channels of the battery), at least one sensor 64, and a battery management system (BMS) 70. The temperature of the battery (pack) 60 may be measured with the at least one sensor 64. In particular, a plurality of sensors 64 may be used such as 4, 6 or 8 sensors. The coolant channels of the battery (pack) 60 may have an input to which a first coolant line 21 is connectable and an output to which another first coolant line 21 is connectable.

The first coolant in the direct battery temperature control system 20 may be a working fluid or liquid such as water, a more vicious liquid (e.g., ethylene glycol) or a mixture of the water and the vicious liquid (e.g., an ethylene glycol water mixture in various ratios, e.g., 50/50, or 40/60). The second coolant in the ground temperature control system 30 may be a working fluid or liquid such as water, a more vicious liquid (e.g., ethylene glycol) or a mixture of the water and the vicious liquid (e.g., an ethylene glycol water mixture in various ratios, e.g., 50/50, or 40/60). The mixture may have some additional agents against corrosion added to it. The first and second coolants may be tuned to have a low electrical conductivity (reducing risk of fire in case of coolant leak). The electrical conductivity of the first and second coolants may be less or equal 100.0 μS/cm, less or equal 80.0 μS/cm, or less or equal 60.0 μS/cm.

The coolants in both systems 20, 30 may be the same or may be different.

In various embodiments the vehicle battery unit 1 comprises a battery management system (BMS) 70 comprising a processor or a controller 70 configured to control the thermal management of the battery (pack) 60 and the operation of the electric pump 50. The vehicle battery unit 1 and in particular the battery (pack) 60 may comprise at least one sensor such as multiple sensor 64 configured to measure the temperature of the battery (pack) 60. The sensor 64 is configured to transmit sensor data (e.g., temperature data) to the BMS 70 and/or the BMS 70 is configured to read sensor data from the sensor 64. Based on these measured sensor data, the processer may control the operation of the battery temperature control system 10.

The BMS 70 may operate the battery temperature control system 10 of the vehicle battery unit 1 in different modes.

In a first mode (of operation), the battery (pack) 60 needs to be cooled because the measured temperature of the battery (pack) 60 is above a first predetermined temperature (e.g., 25° C., 30° C., 35° C., or 40° C.) and the aviation vehicle is airborne. The BMS 70 controls the operation of the electric pump 50 in the direct battery temperature control system 20 so that the first coolant is cooled via air-to-coolant cooling by ambient (ram-) air moving or flowing over and between the cooling fins 440. A cooling of the first coolant via the second coolant does not take place and the air cooling is the only cooling for the first coolant. Since the aviation vehicle is in-flight, the heat exchanger 40 is not connected to the ground support equipment 100 and the second coolant does not move in the coolant lines 31 and thereby does not cool the first coolant.

In a second mode (of operation), the battery (pack) 60 needs to be cooled because the measured temperature of the battery (pack) 60 is above a second predetermined temperature (e.g., 25° C., 30° C., 35° C., or 40° C.) and the aviation vehicle is on ground or parked. Such a scenario may take place when during a very hot day or very hot (local) environmental conditions near the aviation vehicle and/or right after the aviation vehicle landed. The BMS 70 controls the operation of the electric pump 50 in the direct battery temperature control system 20 and may be the operation of the pump in the ground temperature control system 30 so that the first coolant is cooled by the second coolant via coolant-to-coolant cooling. The first coolant may be cooled by 5° C. to 20° C. so that the first coolant reaches a temperature equal or below, e.g., 25° C., 22° C., or 20° C. A cooling of the first coolant via the second coolant takes place and the air cooling may have no or only a minor effect on the first coolant. The second mode may be also be used during charging of the battery (pack) 60.

In a third mode (of operation), the battery (pack) 60 needs to be heated because the measured temperature of the battery (pack) 60 is below a third predetermined temperature (e.g., 16° C., 18° C., 20° C. or 22° C.) and the aviation vehicle is on ground or parked. Such a scenario may take place in order to prepare the aviation vehicle for take-off or when the battery (pack) 60 needs to be charged.

In an extension of the third mode (of operation), the battery (pack) 60 needs to be heated to prevent temperature of the battery (pack) 60 to drop below a fourth predetermined temperature such as a minimum survival temperature (e.g., −30° C., −25° C., −20° C., or −15° C.) and the aviation vehicle is on ground or parked. The minimum survival temperature is a temperature below which the battery (pack) 60 may deteriorate (degradation of performance). The first coolant may be heated by the second coolant via coolant-to-coolant heating by 5° C. to 40° C.

In a fourth mode (of operation) such as an idle mode, the battery (pack) 60 may have a temperature between the first predetermined temperature or the second predetermined temperature and the third predetermined temperature and the BMS 70 controls the pump 50 so that pump 50 is turned off or is in an idle mode in order to save energy.

These operation may require uninterrupted temperature monitoring of the battery (pack) 60 and related thermal conditioning by the at least one sensor 64 and the BMS 70. The BMS 70 controls the operation of the electric pump 50 of the direct battery temperature control system 20 and may be the operation of the pump in the ground temperature control system 30.

For example, assuming the on-ground temperature of the battery (pack) 60 is below 19° C., the battery (pack) 60 needs to be heated to 20° C. in order to bring the aviation vehicle into starting condition. Similarly, assuming the on-ground temperature of the battery (pack) 60 is falling and is approaching −20° C., then the battery (pack) 60 needs to be heated to prevent temperature to drop below −20° C. in order to prevent the battery from deteriorating.

Figure 2A:
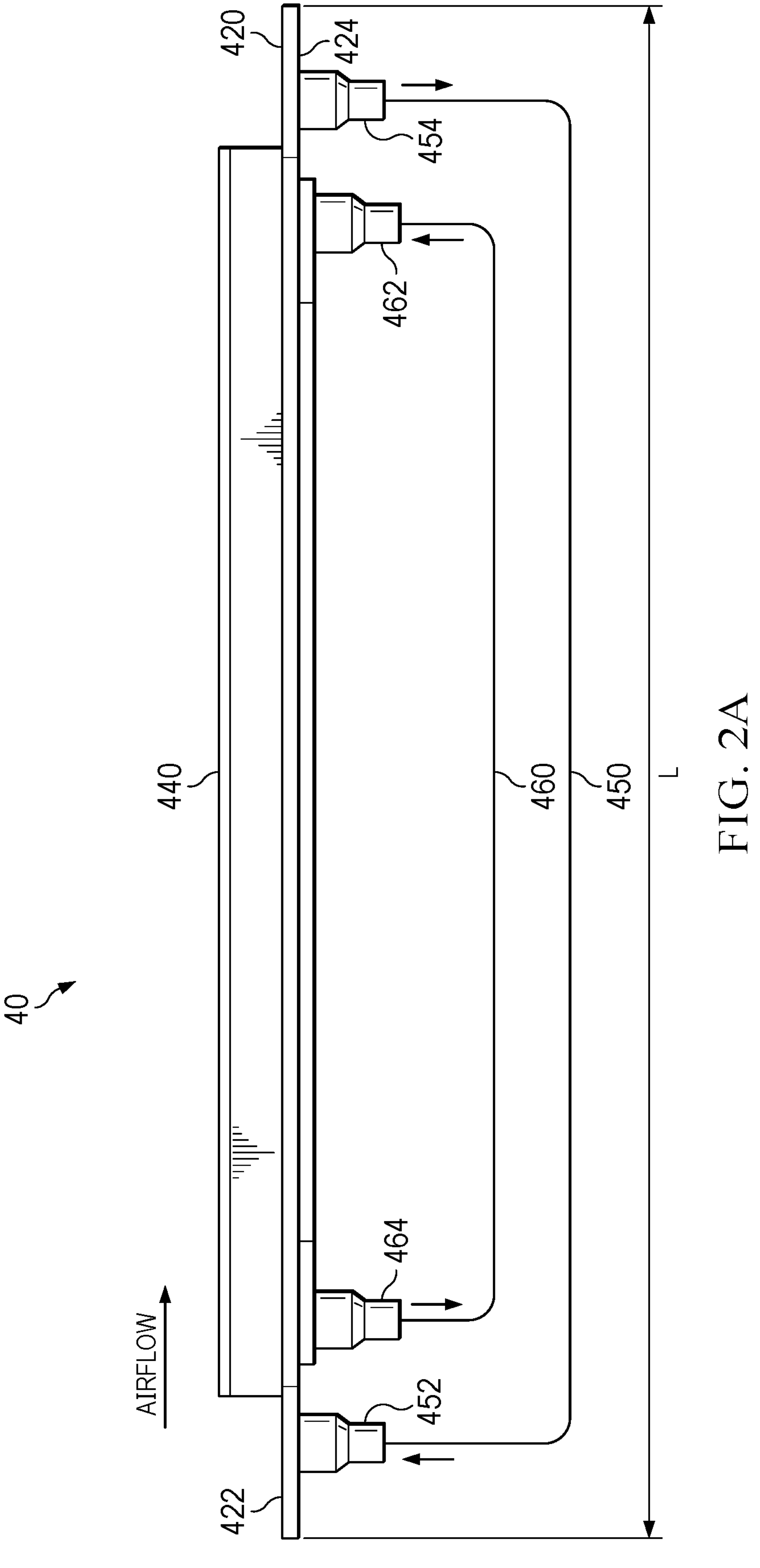
FIG. 2A shows a side view of a heat exchanger according to embodiments.

FIG. 2A shows a side view of the heat exchanger 40 in a first (longitudinal or length) direction L. The heat exchanger 40 has a main body 420. Cooling fins 440 may protrude on a first main side of the main body 420. First input and output connections 450 and second input and output connections 460 may be arranged on a second main side 424 of the main body 420. The first input and output connections 450 may comprise a first input 452 connectable to a first cooling line 21 and a first output 454 connectable to another first cooling line 21. The second input and output connections 460 may comprise a second input 462 connectable to a second cooling line 31 and a second output 464 connectable to another second cooling line 31. The first and second input and output connections 450 and 460 may be hydraulic connectors.

The first input 452 and the second output 464 may be arranged at one end (along first direction L) of the main body 420 and the second input 462 and the first output 454 may be arranged at the other end of the main body 420. The first input and output connections 450 may be spaced apart further than the second input and output connections 460. The first input and output connections 450 may be closer to an end of the main body 420 than the second input and output connections 460.

Other designs are possible. For example, the first input and output connections 450 may be arranged at one end (along first direction L) of the main body 420 and the second input and output connections 460 may be arranged at the other end of the main body 420.

In the first mode, the first input 452 may be an input where the first coolant (warm/hot) coming from the battery (pack) 60 enters the heat exchanger 40 and the first output 454 may be an output where the cooled first coolant leaves the heat exchanger 40 toward the pump 50. The second coolant may not move via the second input and output connections 460. A cooling of the first coolant via the coolant-to-coolant cooling may be insignificant and the cooling of the first coolant via the coolant fins 440 may be the main contributor for the cooling of the first coolant.

In the second mode, the hot first coolant may enter the heat exchanger 40 at input 452, is cooled and leaves the heat exchanger 40 at the first output 454 while the cool second coolant enters the heat exchanger 40 at the first input 462 is heated and leaves the heat exchanger 40 via the second output 464. A cooling of the first coolant via the coolant fins 440 may be insignificant relative to the coolant-to-coolant cooling, and the coolant-to-coolant cooling may be the main contributor for the cooling of the first coolant.

In the third mode, the first coolant may be heated via coolant-to-coolant heating. The hot second coolant enters the heat exchanger 40 at input 462 and leaves the heat exchanger 40 at the second output 464 with a lower temperature while the cool first coolant enters the heat exchanger 40 at the first input 452, is heated and leaves the heat exchanger 40 via the first output 454. This may particularly take place prior electrically charging the battery in (very) cold environmental conditions or before vehicle take-off in cold conditions (if battery temperature is below the third predetermined temperature). In this mode the heat exchanger 40 is connected to the ground support equipment 100 and the ground support equipment 100 may move the second coolant in the coolant lines 31. In various embodiments the ground support equipment 100 may heat the battery (pack) 60 and provide the electrical charging at the same time.

Figure 2B:
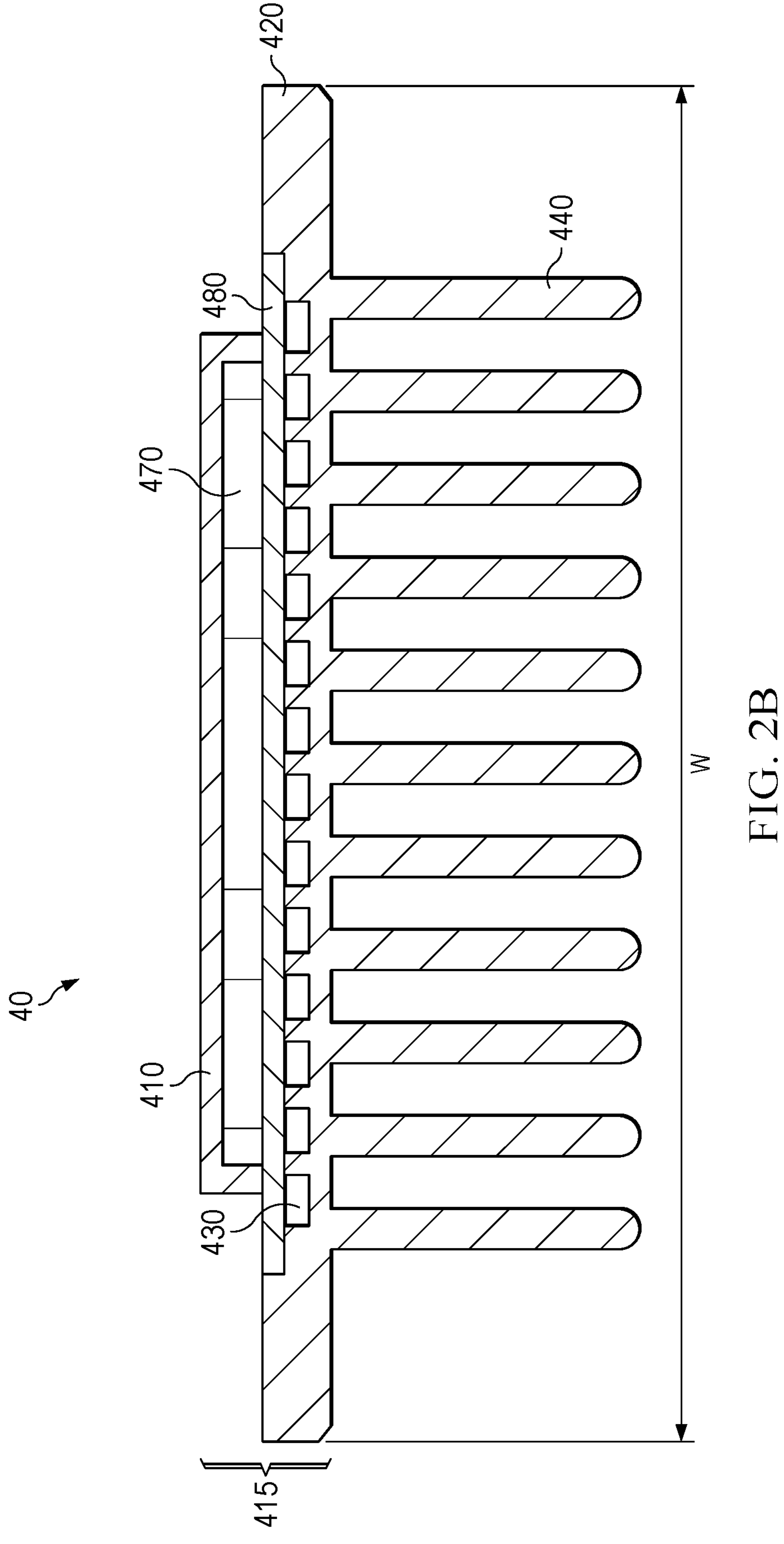
FIG. 2B shows a cross sectional view of the heat exchanger according to embodiments.

FIG. 2B shows a cross sectional view of the heat exchanger 40 in a second (width) direction W orthogonal to the first direction L. The heat exchanger 40 comprises the main body 420 and the fins 440 orthogonally extending from the main body 420. Channels 430, 470 may be arranged or integrated in main body 420. The channels 430, 470 may be of different shapes. For example, the channels 430, 470 may have the form of straight channels or regular or irregular meandering (e.g., sinusoidal wavy) channels. The channels 430, 470 may comprise turbulators (e.g. dimples) in order to enhance heat transfer. The channels 430, 470 may have the same form or different form. For example, 1 channel 470 width may overlap with 2-4 channel 430 widths in cross section. Alternatively, 1 channel 470 width may be vis-a-vis 1 channel 430 width in cross section. Moreover, at least one channel 470 is arranged between each two neighboring fins of the fins 440.

A heat exchange and separating structure 480 may separate the first channels 430 from the second channels 470. The first channels 430 connect the first input 452 to the first output 454 and the second channels 470 connect the second input 462 to the second output 464. The cooling fins 440 and the first channels 430 are arranged on a first side of the heat exchange structure 480 and the second channels 470 are arranged on the other side of the heat exchange structure 480 remote from the cooling fins 440. The heat exchange structure 480 may be an intermediate structure or substrate. The intermediate structure or substrate may be a single layer/substrate or a plurality of layers/substrates. The channels 430, 470 may be arranged directly next to the heat exchange structure. The heat exchange structure 480 is configured to provide (bidirectional) heat exchange between the two coolants flowing in the channels 430, 470 by providing a thermal interface. The heat exchange structure 480 may be a thin metal plate comprising or being made of aluminum without or with heat transfer enhancement features, i.e., turbulators. Turbulators may be dimples or form corrugated surfaces extending into or grow from the heat exchange structure 480. The heat exchange structure 480 may have an extended surface (i.e., fins) protruding into the second channels 470. In various embodiments the heat exchange structure is between 1 mm and 2 mm, inclusive, (e.g., 1.5 mm) thick and between 320 mm and 440 mm, inclusive, (e.g., 380 mm) long resulting in a ratio between 0.002 and 0.006, inclusive (e.g., 0.004).

A base plate 410 may be arranged at the main body 420. The base plate 410 may be arranged on a side remote from the cooling fins 440. The base plate 410 may be integrated in the main body 420 or may be a separate plate connected to the main body 420. The second channels 470 may be arranged or integrated in the base plate 410. The main body 420 and the base plate 410 form the base body 415.

The heat exchanger 40 may comprise or is made of aluminum and in particular the cooling fins 440 may comprise or are made of aluminum.

Figure 2C:
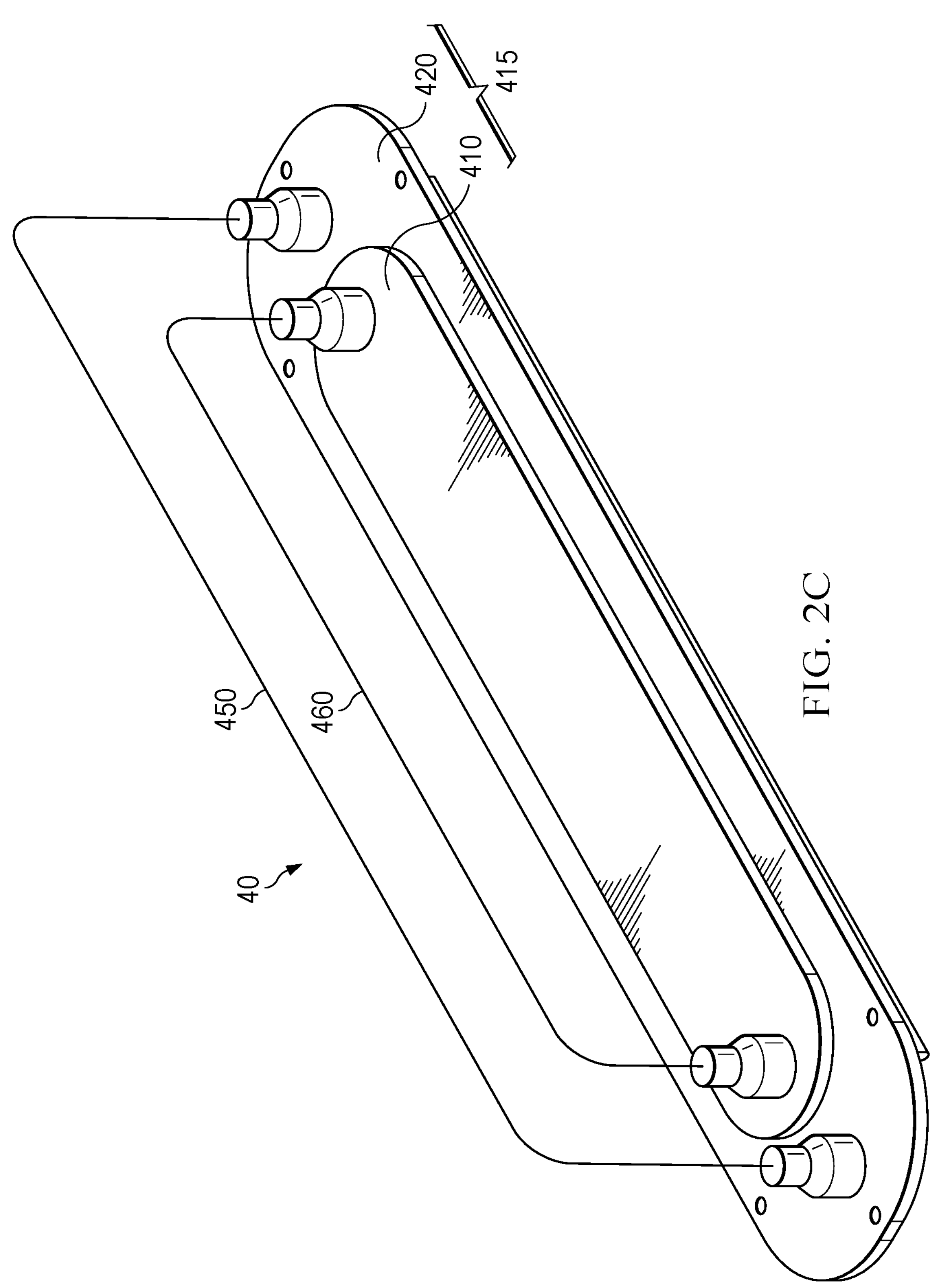
FIG. 2C shows a bottom perspective view of the heat exchanger according to embodiments.

FIG. 2C shows a bottom perspective view of the heat exchanger 40 showing the first and second input and output connections 450, 460. FIG. 2C also shows that the base plate 410 can be dimensionally smaller than the main body 420.

Figure 2D:
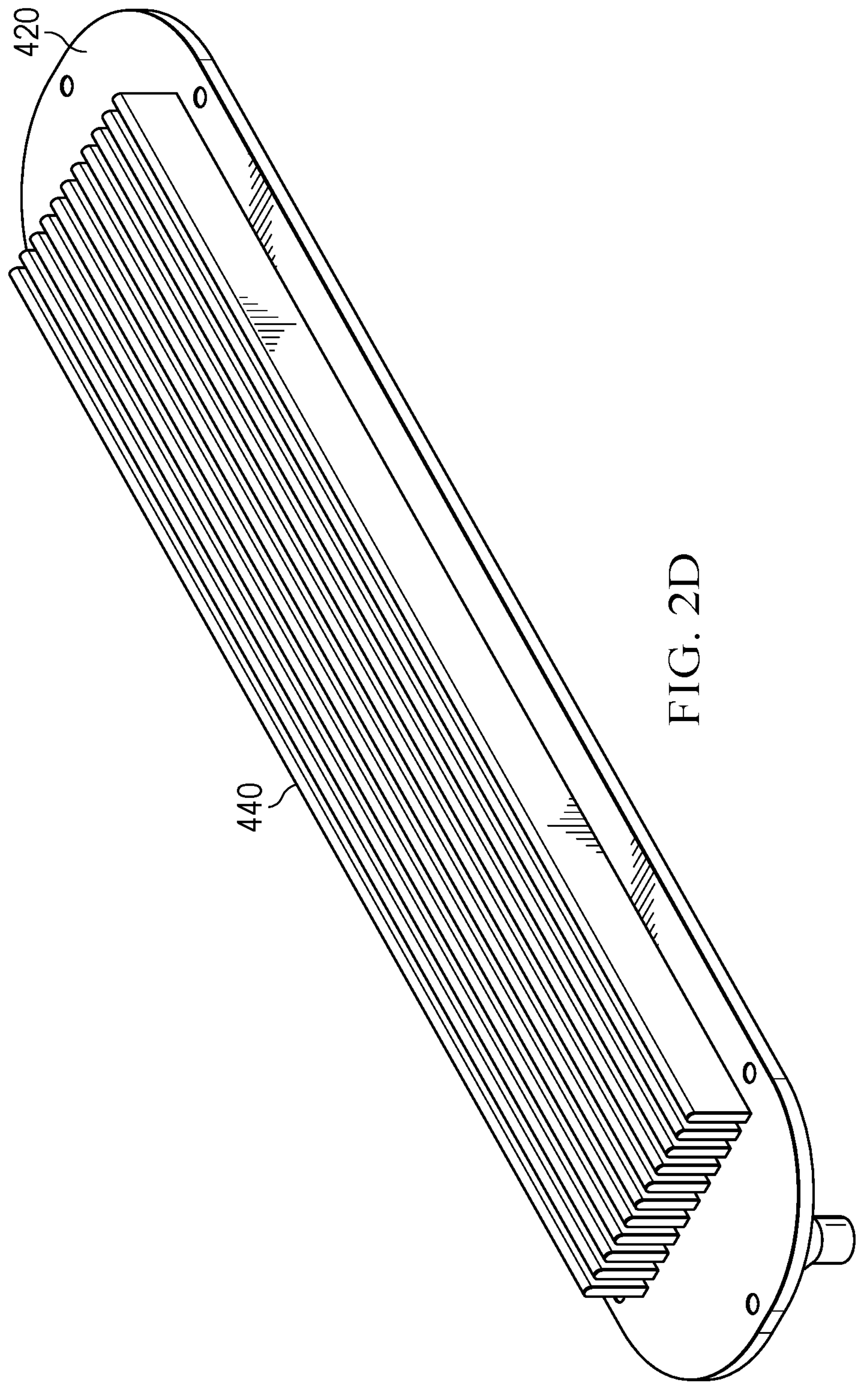
FIG. 2D shows a top perspective view of the heat exchanger according to embodiments.

FIG. 2D shows a top perspective view of an embodiment of the heat exchanger 40 showing the cooling fins 440. The cooling fins 440 all have all the same lengths and are separated by the same distances. The cooling fins 440 may be arranged orthogonally to the base body 415. The cooling fins 440 may be tapered towards the end of each fin.

Figure 2E:
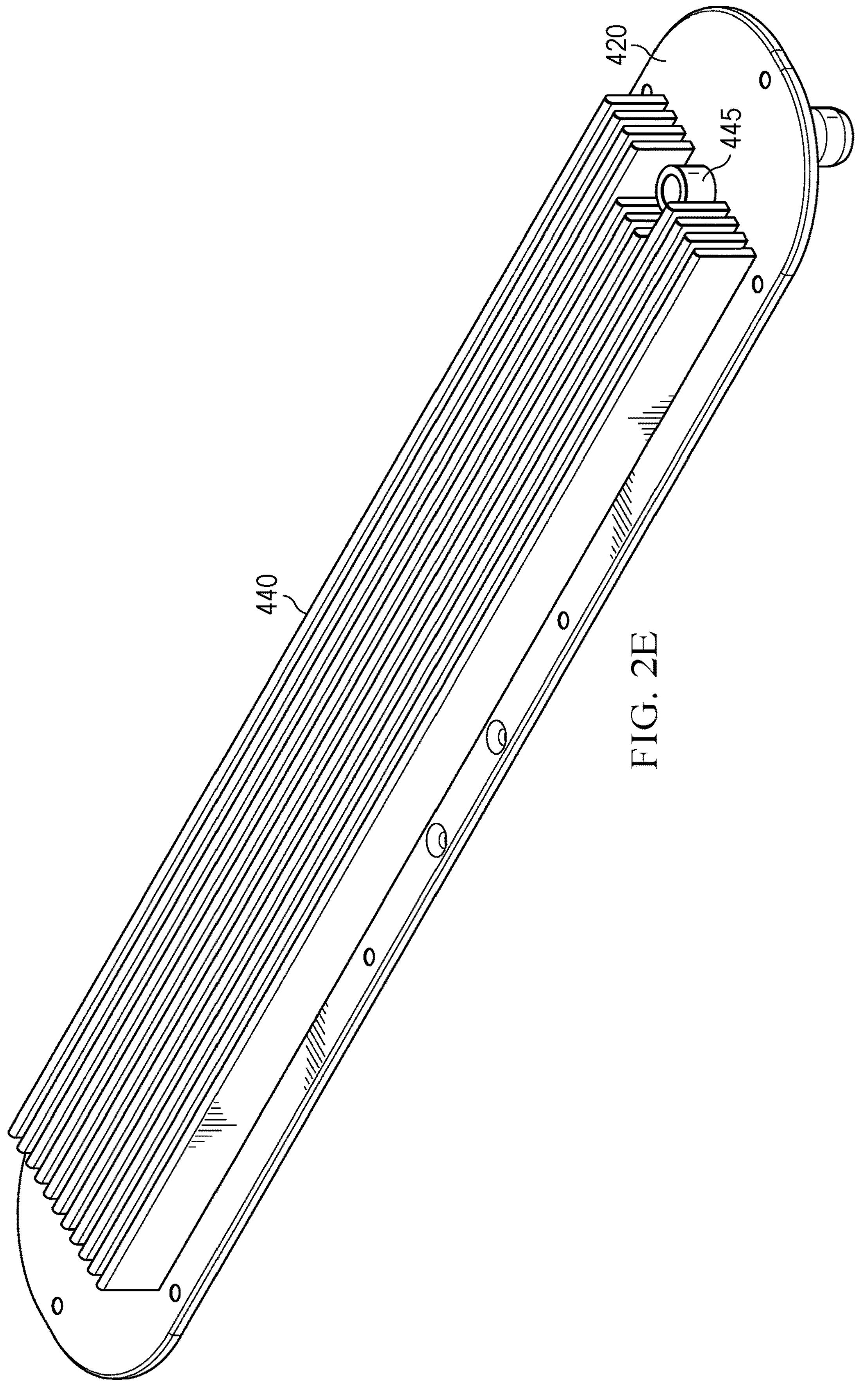
FIG. 2E shows a top perspective view of the heat exchanger according to other embodiments.

FIG. 2E shows a top perspective view of another embodiment of the heat exchanger 40. Here, a connector 445 configured to fill first coolant into the direct battery temperature control system 20 or to de-air the system 20 is arranged on the main body 420. The connector 445 may be arranged between the cooling fins 440. The connector 445 may be arranged at the end of the cooling fins 440 along first direction L. In various embodiments only one such connector 445 may be provided on the heat exchanger 40 for the direct battery temperature control system 20. The heat exchanger 40 may be arranged at an outside surface of a vehicle such the cooling fins 440 are exposed to ambient air and the base plate 410 or the second main side 424 is enclosed by or located in (side) the vehicle surface.

Figure 3:
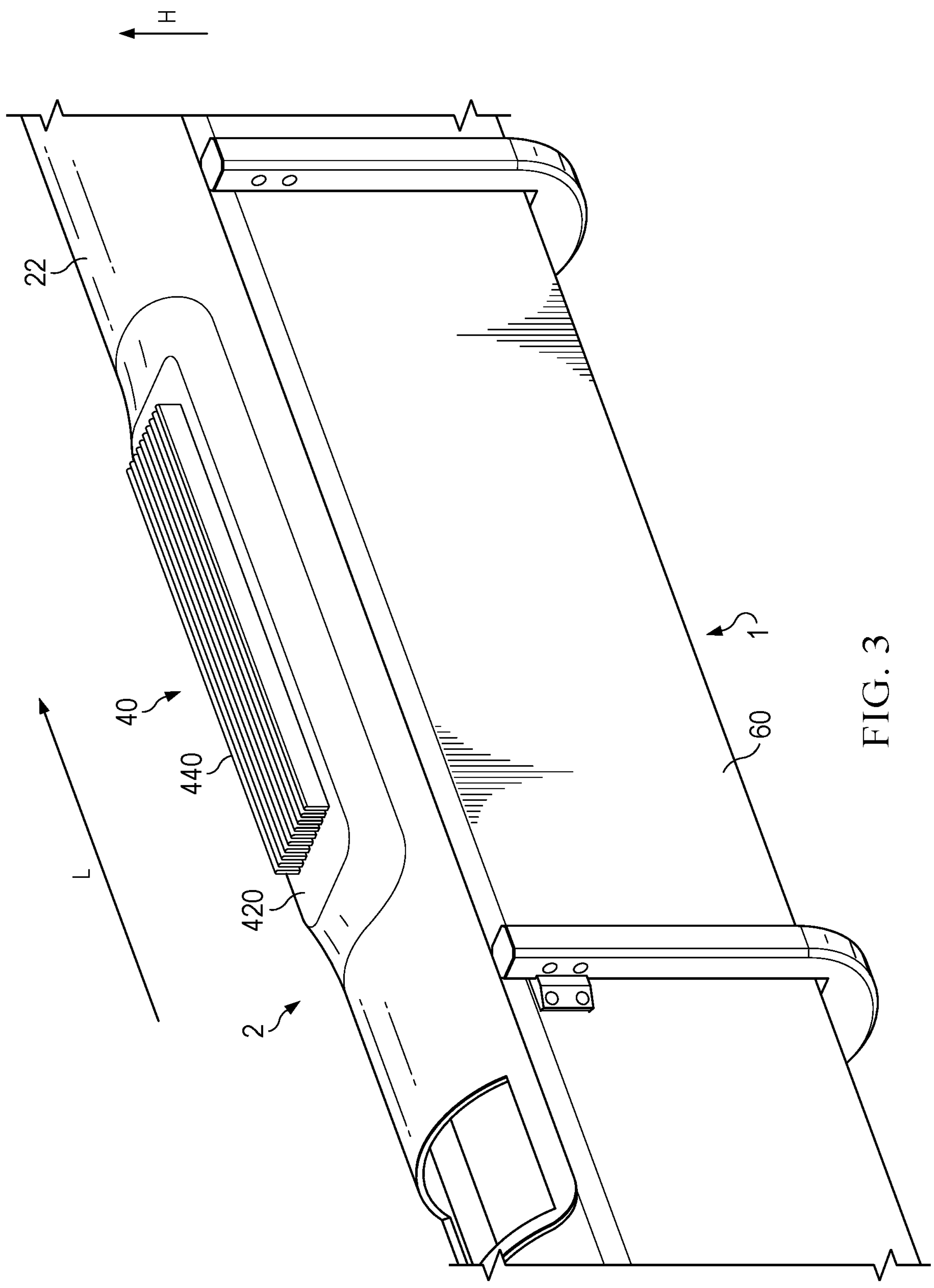
FIG. 3 shows a heat exchanger integrate into a boom according to embodiments.

FIG. 3 shows a perspective view of one battery unit 1 with one heat exchanger 40 integrated into a boom 2. The battery unit 1 and battery (pack) 60 may be tightly integrated into the boom 2. As can be seen, the heat exchanger 40 and in particular the air to coolant type heat exchanger is integrated in a top surface 22 of the boom 2. Cooling fins 440 extend from the main body 420 to an outside of the boom 2. The main body 420 is part of the top surface 22 of the boom 2. Alternatively, the main body 420 is placed on a platform or mesa at the top surface 22 of the boom 2. The length (first direction L), the width (second direction W) and the height (third direction H, perpendicular to first and second directions L, W) of the fins 440 may be optimized for thermal and aerodynamic performance. For example, the length of the fins 440 may be chosen such that they are 15% to 35% of the length the battery (pack) 60. Alternatively, they are 12% to 32% of the length of the battery (pack) 60 or 20% to 30% of the length of the battery (pack) 60. The height of the fins 440 may be chosen such that they measure 4% to 10% of their length or, alternatively, that they measure 6% to 8% of their length. Moreover, they may measure less than 10% or 8% of their length but more than 0%.

As can be further seen from FIG. 3, the boom 2 does not have any ducts or openings for an air-to-liquid type heat exchanger. This may lead to the inventive integrated heat exchanger 40 having the advantage that the boom 2 can be designed with a smaller cross sections along the direction H and W. The narrower boom may reduce cooling track. Moreover, the inventive integrated heat exchanger 40 is advantageous because fewer components are needed since (an) additional and separate liquid-to-liquid type heat exchanger(s) (e.g., plate heat exchanger) is/are not necessary and fewer hydraulic connections (between the components) are used to assemble the battery unit 1. This in turn has the advantage that the inventive battery unit 1 is lighter (less mass) than a comparable conventional battery unit not forgoing the liquid-to-liquid type heat exchanger. This has the further advantage that the pressure drop for the first coolant is smaller than in conventional systems, which means the first coolant has a higher flow rate (assuming the same system pressure drop is achieved) than comparable conventional systems. A lower hydraulic resistance in turn has the advantage that a smaller (and lighter) and/or less powerful electric pump (saving energy) can be used in order to drive or move the first coolant in the coolant lines.

The present disclosure is mainly described with respect to a single vehicle battery unit 1. However, in various embodiments, there may be two, four, six or eight battery units integrated in a boom. Each battery unit may be connected to a vehicle motor and/or motor controller respectively so that, for example, eight battery units and eight vehicle motors and/or motor controllers are integrated in a single boom. In various embodiments, the aeronautic vehicle may have two or four such booms.

A single boom may have a single port at its outer surface for charging the battery unit 1/battery 60 or the battery units 1 or batteries 60. This single port may also include outside connectors 80 for proving hot or cold coolant from the ground support equipment 100. The ground support equipment 100 is configured to provide warm (hot) or cold coolant and also provide power for charging the battery unit(s) 1/battery or batteries 60. For example, the ground support equipment 100 may charge the battery unit(s) 1/battery or batteries 60 while at the same time cooling or heating the battery unit(s) 1/battery or batteries 60. The single port may be arranged at a side surface of the boom 2 of the vehicle.

Figure 4:
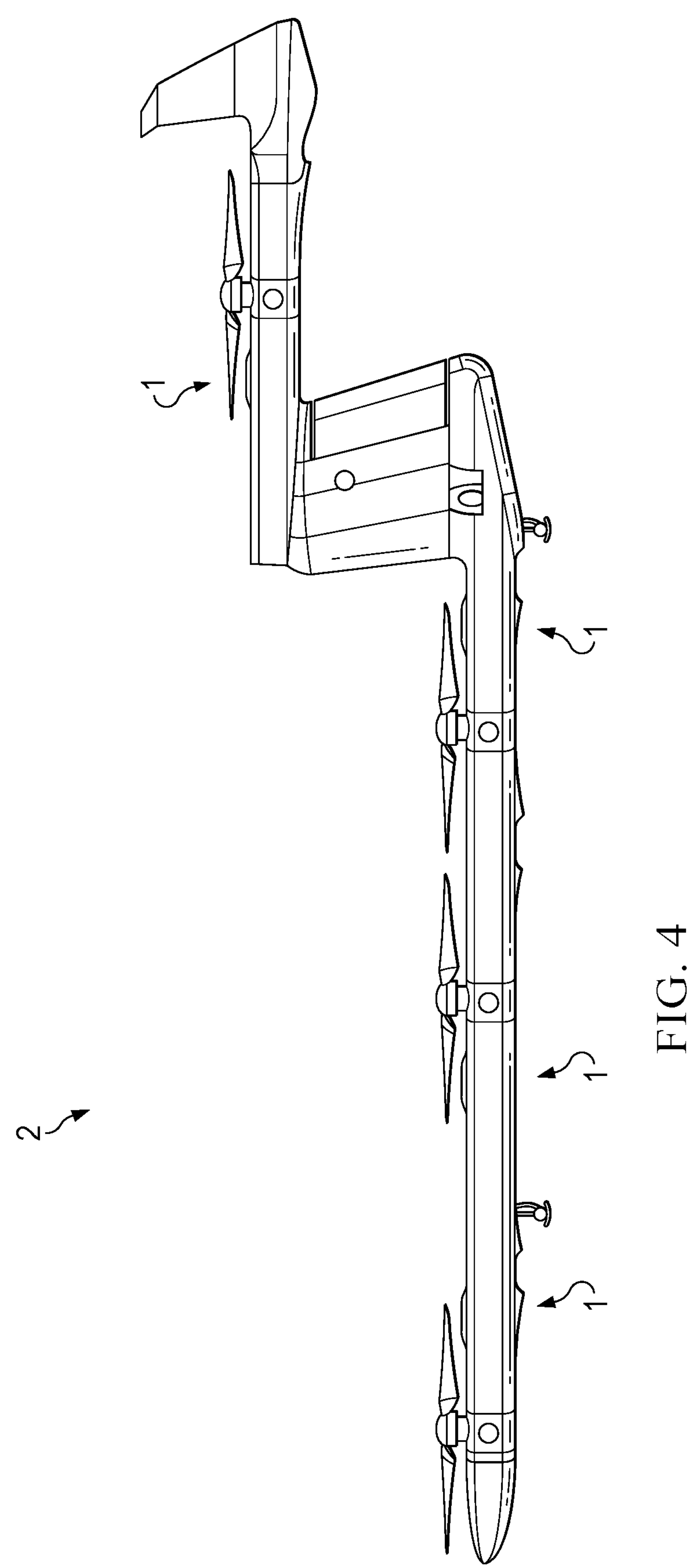
FIG. 4 shows a boom of an aviation vehicle with 4 integrated vertical thrust units and 4 related battery temperature control systems according to embodiments.

FIG. 4 shows a single boom 2 with 4 VTUs and 4 related battery units 1 (one battery unit for one VTU) according to an embodiment. Each battery unit 1 may be mounted together with a cooling system for a vehicle engine unit (e.g., VTU) described in patent application Ser. No. 18/498,982 titled "Cooling System for a Vehicle Engine Unit and Method for Filling such a Cooling System" in the boom 2. This application is incorporated herein by reference in its entirety. An aviation vehicle may have two such booms, each on one side of the aviation vehicle.

Figure 5:
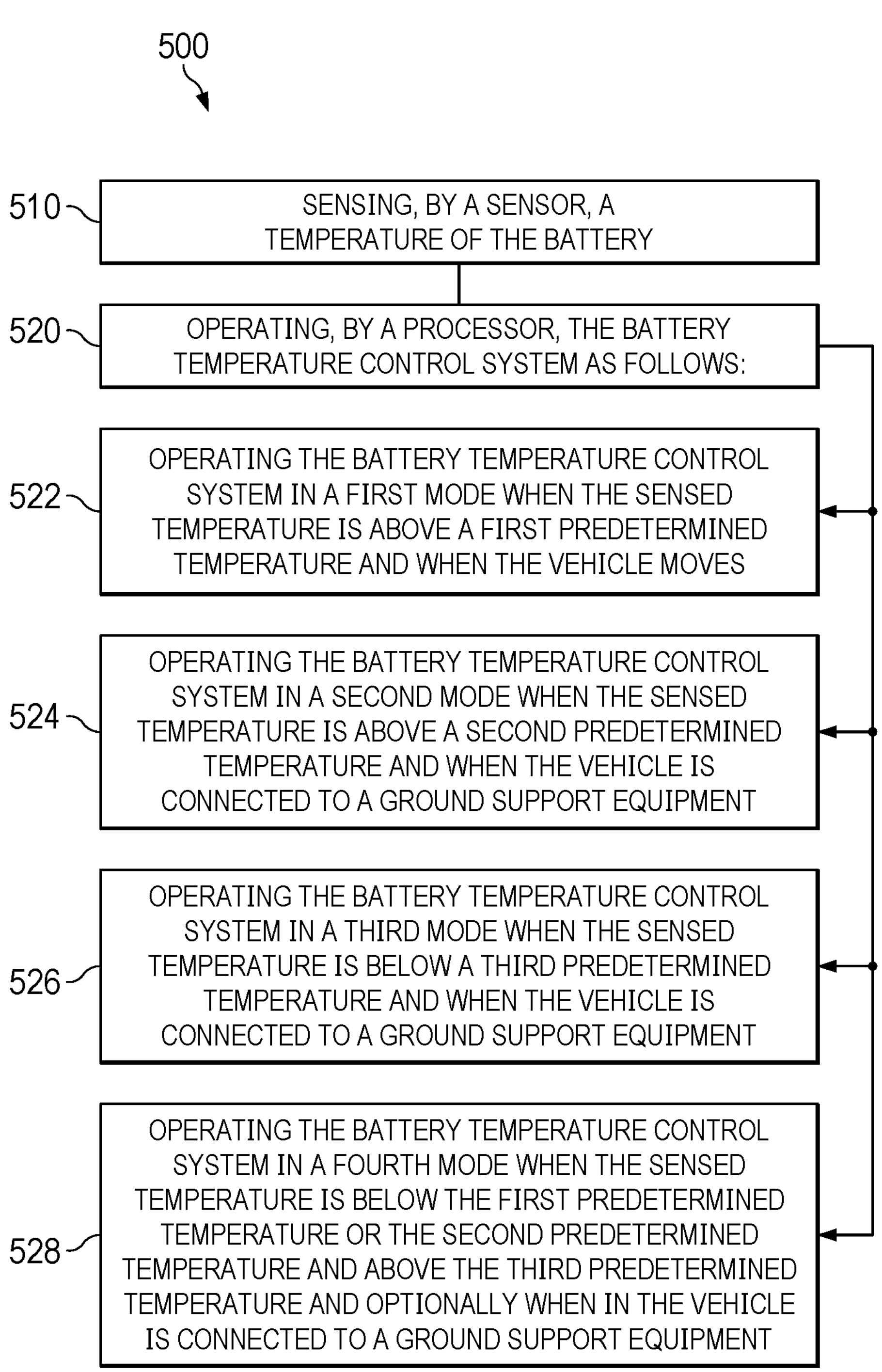
FIG. 5 shows a method for operating a battery temperature control system according to embodiments.

FIG. 5 shows a method for operating a battery temperature control system. The method 500 comprises sensing 510, by at least one sensor at a battery, a temperature of the battery. Based on the sensed information, at least one controller or a battery management system of the battery may operate 520 the battery temperature control system as follows: 1) Operate the battery temperature control system in a first (operation) mode 522 when the sensed temperature is a above a first predetermined temperature and when the vehicle moves, e.g., is airborne or in-flight. In the first mode the battery is cooled via air-to-coolant cooling (e.g., air to liquid cooling). 2) Operate the battery temperature control system in a second (operation) mode 524 when the sensed temperature is above a second predetermined temperature and when the vehicle is connected to a ground support equipment. In the second mode the battery is cooled via coolant-coolant cooling. This may take place on a hot day, when local environmental conditions around the vehicle are hot, or right after the aviation vehicle landed. The first predetermined temperature and the second predetermined temperature may be the same. 3) Operate the battery temperature control system in a third (operation) mode 526 when the sensed temperature is below a third predetermined temperature and when the vehicle is connected to a ground support vehicle. In the third mode, the battery is heated to precondition it for efficient electrically charging via, e.g., ground support equipment. 4) Operate the battery temperature control system in a fourth mode 528 when the sensed temperature is below the first predetermined temperature or the second predetermined temperature and above the third predetermined temperature and optionally when the vehicle is connected to a ground support equipment. Optionally, the battery temperature control system can be operated in a further (operation) mode in order to keep the temperature of the battery above a certain minimum temperature in order to avoid deterioration of the battery. The controller may stop operating in one of the modes and switch to another mode whenever the sensed temperature in the battery passes one of the predetermined temperatures.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An aircraft comprising:

a heat exchanger comprising:

a base body;

cooling fins protruding from a first side of the base body;

first channels integrated into the heat exchanger and connected to a first connector and a second connector; and second cooling and heating channels integrated into the heat exchanger and connected to a first connector and a second connector, wherein the first channels are separate from the second channels, and wherein the first channels and the second channels are arranged on a second side of the base body facing away from the cooling fins;

a battery pack;

an electric pump;

first coolant lines connecting the battery pack and the pump to the first and second connectors of the first channels of the heat exchanger thereby forming a closed loop; and second coolant lines connecting the first and second connectors of the second channels to outside connectors, wherein the outside connectors are arranged at an outside surface of the aircraft, and wherein the heat exchanger is arranged on the outside surface of the aircraft such that the cooling fins are facing a rotor or a propeller of the aircraft.

2. The aircraft of claim 1, wherein the outside surface of the aircraft is a portion of a boom of the aircraft.

3. The aircraft of claim 2, wherein the heat exchanger is integrated in an upper surface of the boom facing the same side as the rotor or the propeller.

4. The aircraft of claim 1, wherein the cooling fins extend orthogonally from the outside surface of the aircraft.

5. The aircraft of claim 1, wherein the first and second channels are integrated in the base body.

6. The aircraft of claim 1, wherein the outside connectors are connectable to a ground support equipment and are configured to receive warm or cold coolant.

7. The aircraft of claim 3, wherein the outside connectors are integrated in a side surface of the boom.

8. The aircraft of claim 5, wherein the base body includes the heat exchange and separating plate arranged between the first channels and the second channels.

9. The aircraft of claim 8, wherein the heat exchange and separating plate is a thin aluminum plate.

10. The aircraft of claim 8, wherein the heat exchange and separating plate further comprises turbulators.

11. The aircraft of claim 1, wherein the first and second connectors of the first channels are arranged on opposite ends of the base body, and wherein the first and second connectors of the second channels are arranged on the opposite ends of the base body.

12. The aircraft of claim 11, wherein a distance spacing apart the first and second connectors of the second channels is smaller than a distance spacing apart the first and second connectors of the first channels.

13. The aircraft of claim 1, further comprising a third connector connected to the first channels, wherein the third connector is configured to fill or de-air the first channels.

14. The aircraft of claim 13, wherein the third connector is arranged between the cooling fins.

15. The aircraft of claim 14, wherein the third connector is arranged at longitudinal end of the cooling fins.

16. The aircraft of claim 2, wherein the heat exchanger is integrated in an upper surface of the boom facing the same side as the rotor or the propeller so that only the main body and the cooling fins are part of the outside surface of the aircraft.

17. An aircraft comprising:

a heat exchanger comprising:

a longitudinal base body;

cooling fins protruding from a first side of the base body;

first channels integrated into the heat exchanger and connected to a first connector and a second connector; and second cooling and heating channels integrated into the heat exchanger and connected to a first connector and a second connector, wherein the first channels are separate from the second channels, wherein the first channels and the second channels are arranged on a second side of the base body facing away from the cooling fins, wherein the first and second connectors of the first channels are arranged on opposite ends of the longitudinal base body, and wherein the first and second connectors of the second channels are arranged on the opposite ends of the longitudinal base body, and wherein a distance spacing apart the first and second connectors of the second channels is smaller than a distance spacing apart the first and second connectors of the first channels; and a third connector located on the longitudinal base body and connected to the first channels, wherein the third connector is configured to fill or de-air the first channels;

a battery pack;

an electric pump;

first coolant lines connecting the battery pack and the pump to the first and second connectors of the first channels of the heat exchanger thereby forming a closed loop; and second coolant lines connecting the first and second connectors of the second channels to outside connectors, wherein the outside connectors are arranged at an outside surface of the aircraft, and wherein the heat exchanger is arranged on the outside surface of the aircraft such that the cooling fins are facing a rotor or a propeller of the aircraft.

18. The aircraft of claim 17, wherein the third connector is arranged between the cooling fins.

19. The aircraft of claim 18, wherein the third connector is arranged at longitudinal end of the cooling fins.

20. The aircraft of claim 18, wherein the third connector is partially surrounded by the cooling fins.

* * * * *